(12) United States Patent
Krüger et al.

(10) Patent No.: US 10,562,751 B2
(45) Date of Patent: Feb. 18, 2020

(54) CARTRIDGE HOUSING FOR A BEVERAGE OR FOOD CARTRIDGE

(71) Applicant: Freezio AG, Amriswil (CH)

(72) Inventors: Marc Krüger, Bergisch Gladbach (DE); Günter Empl, Bergisch Gladbach (DE); Daniel Fischer, Romanshorn (CH)

(73) Assignee: Freezio AG, Amriswil (CH)

( * ) Notice: Subject to any disclaimer, the term of this patent is extended or adjusted under 35 U.S.C. 154(b) by 0 days.

(21) Appl. No.: 16/069,766

(22) PCT Filed: Jan. 12, 2017

(86) PCT No.: PCT/EP2017/050562
§ 371 (c)(1),
(2) Date: Jul. 12, 2018

(87) PCT Pub. No.: WO2017/121797
PCT Pub. Date: Jul. 20, 2017

(65) Prior Publication Data
US 2019/0016580 A1    Jan. 17, 2019

(30) Foreign Application Priority Data
Jul. 1, 2016 (DE) .......................... 10 2016 212 013

(51) Int. Cl.
*B67D 1/00* (2006.01)
*B67D 7/02* (2010.01)
(Continued)

(52) U.S. Cl.
CPC .............. *B67D 1/0079* (2013.01); *A23L 2/54* (2013.01); *A47J 31/407* (2013.01);
(Continued)

(58) Field of Classification Search
CPC ...... B67D 1/0079; B67D 1/0046; B67D 1/04; A47K 31/407; B65D 85/8043
(Continued)

(56) References Cited

U.S. PATENT DOCUMENTS 4,314,768 A    2/1982 Goglio et al.
4,376,496 A    3/1983 Sedam et al.
(Continued)

FOREIGN PATENT DOCUMENTS

DE        29825074 U1    9/2004
DE    102009049945 A1    4/2011
(Continued)

OTHER PUBLICATIONS

International Search Report for International Application PCT/EP2017/050562, dated Apr. 13, 2017.
(Continued)

*Primary Examiner* — Jeremy Carroll
(74) *Attorney, Agent, or Firm* — The Dobrusin Law Firm, P.C.; Daniela M. Thompson-Walters

(57) ABSTRACT

The invention relates to a cartridge housing comprising a diluting means, especially a water supply, a mixing chamber in which the diluting means and a beverage and/or food substrate are mixed, and an outlet. The cartridge housing is fitted with a hollow rod such that the sealing film of the cartridge is pierced as soon as the cartridge is inserted into the cartridge housing, thereby creating the flow connection between the cartridge and a mixing chamber.

19 Claims, 11 Drawing Sheets

(51) Int. Cl.
  *A47J 31/40* (2006.01)
  *A23L 2/54* (2006.01)
  *B67D 1/04* (2006.01)
  *B65D 85/804* (2006.01)
  *A47J 31/44* (2006.01)
  *B67D 1/08* (2006.01)

(52) U.S. Cl.
  CPC ....... *A47J 31/4425* (2013.01); *A47J 31/4492* (2013.01); *B65D 85/8043* (2013.01); *B67D 1/0022* (2013.01); *B67D 1/0046* (2013.01); *B67D 1/0078* (2013.01); *B67D 1/04* (2013.01); *B67D 1/045* (2013.01); *B67D 7/0227* (2013.01); *B67D 7/0233* (2013.01); *A23V 2002/00* (2013.01); *B67D 2001/0811* (2013.01); *B67D 2001/0812* (2013.01)

(58) Field of Classification Search
  USPC ..................................................... 222/145.6
  See application file for complete search history.

(56) References Cited

U.S. PATENT DOCUMENTS

| | | | |
|---|---|---|---|
| 5,836,482 A | 11/1998 | Ophardt | |
| 6,971,549 B2* | 12/2005 | Leifheit | A47K 3/281 |
| | | | 141/330 |
| 2002/0130140 A1 | 9/2002 | Cote | |
| 2003/0000964 A1 | 1/2003 | Schroeder et al. | |
| 2003/0071058 A1* | 4/2003 | Studer | A47K 5/12 |
| | | | 222/88 |
| 2006/0249536 A1 | 11/2006 | Hartman et al. | |
| 2008/0029541 A1 | 2/2008 | Wallace et al. | |
| 2009/0308488 A1 | 12/2009 | Bennett | |
| 2010/0193544 A1* | 8/2010 | Rusch | B67B 7/28 |
| | | | 222/82 |
| 2012/0037662 A1* | 2/2012 | Romanyszyn | B67D 1/07 |
| | | | 222/145.2 |
| 2012/0121780 A1 | 5/2012 | Lai et al. | |
| 2012/0207893 A1 | 8/2012 | Krüger | |
| 2016/0297664 A1* | 10/2016 | Broodryk | B67D 3/0035 |

FOREIGN PATENT DOCUMENTS

| | | |
|---|---|---|
| DE | 102009052513 U1 | 5/2011 |
| EP | 1671568 A2 | 6/2006 |
| EP | 1806314 A1 | 7/2007 |
| EP | 2017219 A1 | 1/2009 |
| EP | 2017221 A1 | 1/2009 |
| EP | 2080454 A1 | 7/2009 |
| EP | 2923772 A1 | 9/2015 |
| GB | 2020631 A | 11/1979 |
| GB | 2033333 A | 5/1980 |
| GB | 2416757 A | 2/2006 |
| WO | 1996/036556 A1 | 11/1996 |
| WO | 98/05586 A1 | 2/1998 |
| WO | 01/21292 A1 | 3/2001 |
| WO | 2004/099060 A2 | 11/2004 |
| WO | 2005/079361 A2 | 9/2005 |
| WO | 2006/005401 A2 | 1/2006 |
| WO | 2011/084603 A1 | 7/2011 |
| WO | 2013/036564 A2 | 3/2013 |

OTHER PUBLICATIONS

International Preliminary Report on Patentability for International Application PCT/EP2017/050562, dated Mar. 13, 2018.
European Search Report for European Application 19157800, dated Jun. 14, 2019.

* cited by examiner

CARTRIDGE HOUSING FOR A BEVERAGE OR FOOD CARTRIDGE

BACKGROUND

The invention relates to a cartridge receptacle having a diluent, in particular water, inflow, a mixing chamber in which the diluent and a beverage substrate and/or foodstuff substrate are mixed, and an outflow.

Cartridge receptacles of this kind are known from the prior art, for example from EP 2 017 221 A1 and WO 2006/005401 A2, and are used to produce for example cold beverages by means of cartridges. In addition to good hygiene, good mixing between the beverage substrate and/or foodstuff substrate and the solvent, in particular water, which are mixed in the cartridge receptacle is important.

SUMMARY

Therefore, it was the object of the present invention to provide a cartridge receptacle which satisfies these demands.

The object is achieved by a cartridge receptacle having a diluent, in particular water, inflow, a mixing chamber in which the diluent and a beverage substrate and/or foodstuff substrate are mixed, and an outflow, wherein, with regard to the direction of flow of the diluent, the flow cross section is first expanded and then reduced again.

The statements made with regard to this subject of the present invention apply equally to the other subjects of the present invention and vice versa.

The present invention relates to a cartridge receptacle which reversibly or irreversibly receives a cartridge, in particular partially. The cartridge has a cavity in which a beverage substance and/or foodstuff substance is located and which is hermetically sealed prior to beverage and/or foodstuff production. In order to produce the beverage and/or the foodstuff, the cartridge is then opened, in particular pierced, and the substrate runs/flows into a mixing chamber of the cartridge receptacle, which also has a solvent, in particular water, inflow, which is mixed with the substrate in order to produce the finished beverage or foodstuff, which runs out of the mixing chamber through an outflow likewise provided on the cartridge receptacle. The volumetric flow of the solvent is in this case generally much greater than the volumetric flow of the substrate.

According to the invention, the flow cross section, i.e. the cross section which is available for the liquid to flow, in particular for the solvent flow and/or the mixture of solvent and substrate, is now provided such that, with regard to the direction of flow of the solvent, the flow rate is first of all slowed down and then accelerated again. The acceleration which is achieved by a flow cross section constriction takes place as far as possible after the solvent and the substrate have been blended.

The particular transition between the region with an expanded flow cross section and the regions with a constricted flow cross section is defined by the profile of the wall of the mixing chamber. To this end, the wall can have a curved or stepped, or angular, profile in the transition regions.

According to a further preferred subject, or subject according to the invention, of the present invention, the mixing chamber has a protuberance.

The statements made with regard to this subject of the present invention apply equally to the other subjects of the present invention and vice versa.

This protuberance projects preferably out of the circumference, in particular the lateral circumference, which extends between the two end sides of the cartridge receptacle. Preferably, the protuberance is part of the mixing chamber. Preferably, the circumference of the mixing chamber has a substantially circular shape and the protuberance projects out of this circular shape. According to a particularly preferred embodiment of the present invention, the outflow of the finished beverage or foodstuff is provided in the protuberance.

According to a further preferred subject, or subject according to the invention, of the present invention, the cartridge receptacle has a fastening and/or securing ring. This fastening and/or securing ring preferably receives the cartridge, which is fastened to the cartridge receptacle. Preferably, the fastening and/or securing ring is provided with a predetermined breaking point and/or predetermined deformation point at the mixing chamber. Before the production of a beverage or foodstuff, this point is destroyed and/or deformed, in particular irreversibly deformed. This can take place for example by the cartridge and the cartridge receptacle being moved relative to one another. As a result of the deformation and/or destruction, the cartridge receptacle can be used only once and/or the interconnection between the cartridge receptacle and the cartridge can no longer be released.

Preferably, at least one mixing element is provided in the mixing chamber, said mixing element ensuring that the solvent or the mixture of solvent and substrate is swirled. Preferably, the mixing element is provided as a protuberance in the bottom. Preferably, the mixing element is designed such that carbonic acid which is dissolved in the solvent does not outgas or outgases only a little. Preferably, the mixing element is designed such that it exhibits only a slight pressure drop.

Preferably, the cartridge receptacle has a piercing means which perforates the membrane. This piercing means is designed for example as a spike which projects out of the bottom of the mixing chamber. Preferably, the piercing means has, on its outer circumference, at least one, preferably a plurality of indentations and/or protuberances, which serve as outflow for the substrate. The quantity and size of the indentations and/or protuberances depend preferably on the viscosity of the substrate. Preferably, the piercing means has a channel which ends in or in the region of the tip. Through this channel, it is possible for a gas, in particular air or $CO_2$, to be blown into the cartridge in order to accelerate and/or to meter the dispensing of the substrate.

Preferably, the cartridge receptacle has a spike guide, wherein the piercing means is mounted in a displaceable manner within the spike guide, wherein the piercing means is displaceable between a retracted position, in which the piercing means is away from the membrane, and an extended position, in which the piercing means pierces the membrane of the cartridge and projects into the cartridge. Preferably at least one lateral channel for conveying the beverage substrate and/or foodstuff substrate in the direction of the mixing chamber when the membrane is pierced by the piercing means has been introduced into the outer wall of the piercing means. Furthermore, a compressed-air line is particularly preferably integrated into the piercing means, wherein a compressed-air connection for connecting to a compressed-air source is formed on a side of the piercing means that is remote from the cartridge, said compressed-air connection being accessible in particular from outside the cartridge receptacle, and wherein a on a side of the piercing means that faces the cartridge Preferably, the inflow and the outflow are provided at opposite ends of the cartridge receptacle. Particularly preferably, the piercing means is provided in a manner aligned with the inflow and the outflow.

According to a further preferred subject, or subject according to the invention, of the present invention, the outlet is provided in a movable, in particular pivotable, manner on the mixing chamber, or has a means with which the outlet can be oriented, in particular can be directed in the direction of the side wall of the vessel which receives the finished beverage or foodstuff. This embodiment is advantageous in particular in the case of beverages or foodstuffs that tend to foam. The outlet can be moved manually or by a motor. In the event that the cartridge has an identification, the pivoting can take place automatically after the dispenser has recognized the cartridge.

A further subject of the present invention is a system having the preferred cartridge receptacle, or cartridge receptacle according to the invention, on/in which a cartridge is provided, said cartridge having a wall region, one end of which is adjoined by a connecting region which is closed, in particular by a membrane (14), and at the opposite end of which optionally a bottom region is provided, wherein the wall region and optionally the bottom region define a cavity which accommodates a beverage substrate and/or foodstuff substrate.

The statements made with regard to this subject of the present invention apply equally to the other subjects of the present invention and vice versa.

The cartridge is produced preferably from plastic, in particular by a molding and/or blow-molding process. The cartridge has a side wall which has for example a round, rectangular, square, conical or oval cross section. A bottom is generally provided, in particular in one piece, at one end of the side wall. The side wall and optionally the bottom region define a cavity in which a beverage substrate and/or foodstuff substrate, in particular in liquid form, is provided. Provided at the other end of the wall region is a connecting region by way of which the cartridge is connected to the cartridge receptacle. This cartridge receptacle can be part of a dispenser or a component separate from the dispenser.

Preferably, the connecting region is provided such that it has a flange. The flange protrudes from the connecting region and projects from a wall region of the connecting region preferably at an angle, particularly preferably at right angles. In order to produce the beverage or foodstuff, the flange is oriented preferably horizontally. Preferably, the flange is made of solid material, i.e. not manufactured in a hollow manner.

Further preferably, the flange is provided with a positioning and/or covering means. The positioning means ensures that the cartridge can be arranged on the dispenser and/or on the cartridge receptacle only in a particular position, in particular at a particular angle of rotation, in particular with regard to the longitudinal center axis of the cartridge. The covering means covers a region, in particular a region through which the finished beverage or foodstuff flows out. Preferably, the positioning means and the covering means are identical.

Preferably, the positioning means and/or covering means is an indentation and/or protuberance which protrudes from the flange, in particular the circumference thereof. Preferably, the positioning means and/or covering means is provided in one piece with the flange. For example, the positioning means and/or covering means is configured as a lug which is integrally formed at one point on the circumference of the flange. The thickness of the positioning means and/or covering means corresponds in this case at least substantially to the thickness of the flange.

According to one preferred embodiment, a neck is provided between the wall region and the connecting region. This neck can have for example a round cross section. The neck represents the wall region of the connecting region. The flange adjoins the neck preferably at right angles.

Preferably, the membrane which closes, in particular hermetically seals, the cartridge before it is used, is provided on the flange, in particular the end face thereof, in particular in a sealed manner. To this end, the flange, in particular the end face thereof, can have a bead, in particular a bead in the form of a circular ring, which cooperates with the sealing tool during sealing. Preferably, the outer circumference of the membrane is less than the outer circumference of the flange.

Preferably, a fastening means is provided in the wall region and/or in the region of the neck. By way of this fastening means, the cartridge can be connected to a dispenser. The fastening means can be for example a groove in which a fastening means on the dispenser engages.

The cartridge receptacle can be connected fixedly to the cartridge or be a replacement part which is removed from the cartridge after the latter has been used, and is connected to a new cartridge. Preferably, the cartridge receptacle is made of plastic, in particular by injection-molding. Preferably, the cartridge receptacle is connected to a dispenser.

Preferably, the covering means, which is provided on the flange of the cartridge, covers the outflow of the cartridge receptacle.

Preferably, the flange on the cartridge, in particular the circumference thereof, cooperates in a sealing manner with the cartridge receptacle. To this end, the circumference of the flange can engage for example in a groove in the cartridge receptacle. This flange/groove connection can also serve as a force-fit, in order to prevent the cartridge from shifting relative to the cartridge receptacle during beverage or foodstuff production and the connection between the cartridge and cartridge receptacle losing its tightness.

According to one preferred embodiment, the cartridge and the cartridge receptacle are provided to be longitudinally displaceable with respect to one another, in particular before the membrane is pierced. As a result of this longitudinal displacement, the piercing means can then be brought into engagement with the membrane and pierce the latter.

Preferably, the cartridge and the cartridge receptacle are connected together in a rotationally fixed manner.

Preferably, the piercing means has a channel. Through this channel, a gas can be pushed into the cartridge, which pushes the beverage substrate and/or foodstuff substrate out of the cartridge, in particular into the mixing space of the cartridge receptacle.

BRIEF DESCRIPTION OF THE DRAWINGS

In the following text, the invention is explained by way of FIGS. 1 to 15. These explanations are merely by way of example and do not limit the general concept according to the invention. The explanations apply to the cartridge according to the invention and to the system according to the invention equally.

DETAILED DESCRIPTION

Figure 1:
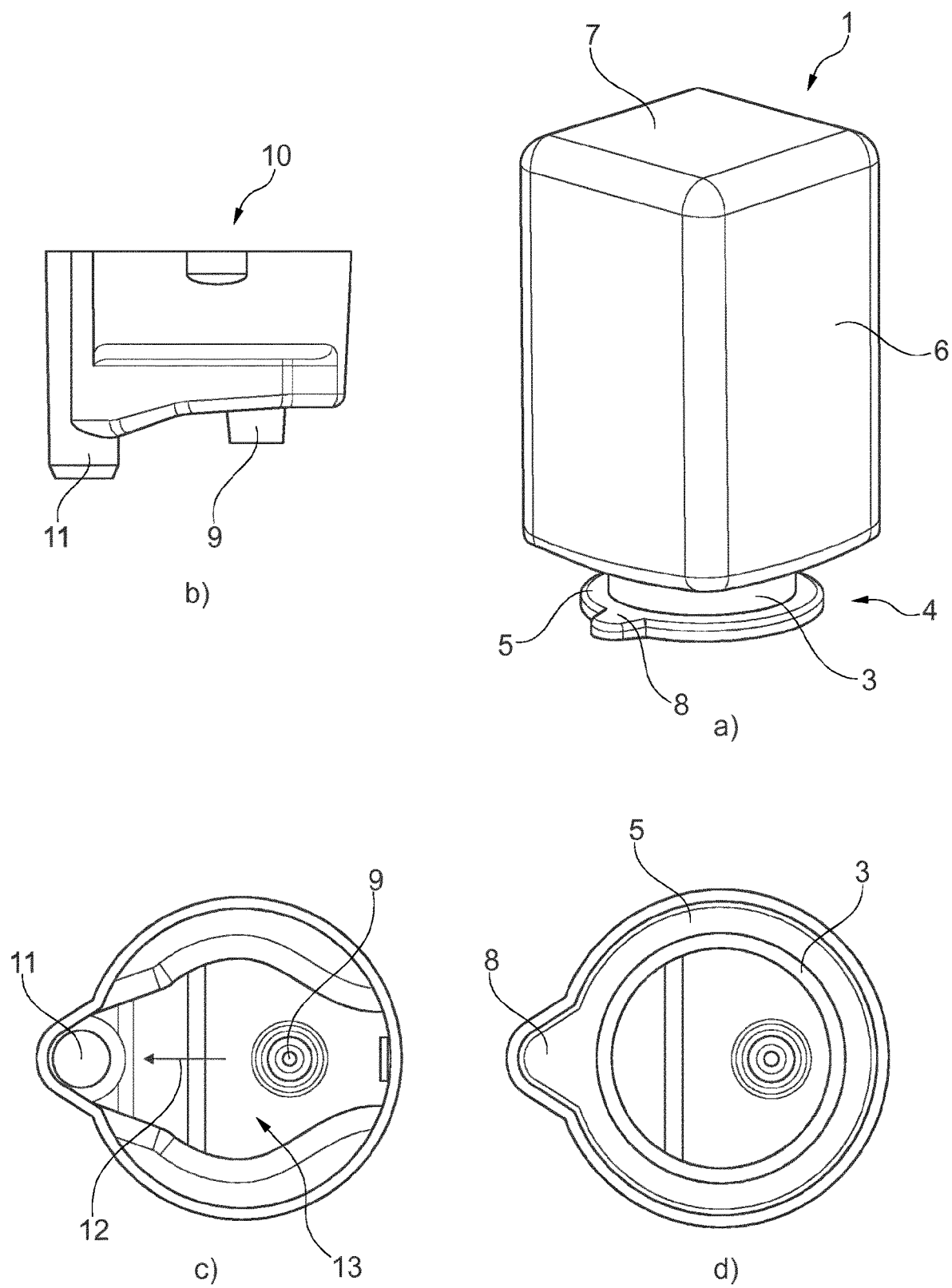
FIGS. 1-4 show a first embodiment of the system according to the invention.

FIGS. 1-4 show a first embodiment of the system according to the invention, which consists of a cartridge 1 and a cartridge receptacle 10. The cartridge is manufactured preferably from a plastic material, for example by injection-molding or by a blow-molding technique. The cartridge has an, in the present case, a square, wall region 6, and in this case an upper end of which is adjoined by a bottom region 7. The wall region 6 and the bottom region 7 delimit a cavity in which the beverage substrate and/or foodstuff substrate, in particular a concentrate, is located, with which a beverage or foodstuff can be produced. At the opposite end of the wall region from the bottom region, in this case the lower end, a connecting region 4 is provided, which in the present case has a neck 3 and a flange 5. The cavity of the cartridge is hermetically sealed by a closure 14, in this case a membrane, after it has been filled. The membrane 14, in particular a plastic foil is connected to the flange preferably cohesively, in particular by sealing. By way of the connecting region, the cartridge is connected to a cartridge receptacle. A positioning and/or covering means 8, which in the present case is provided as a protuberance, in particular as a lug-like protuberance, is provided on the flange 5. The lug is in this case integrally formed on the flange. Furthermore, as can be gathered in particular from FIGS. 1b) and c), the system has a cartridge receptacle 10. This cartridge receptacle has a solvent, in particular water, inflow 15 (cf. FIG. 2) and a mixing chamber 13 in which the solvent and the beverage substrate and/or foodstuff substrate are mixed. The direction of flow of the mixture is indicated by the arrow 12 in FIG. 1c). The finished beverage/foodstuff leaves the mixing chamber through the outflow 11 and is collected in a container, for example a glass. Furthermore, as can be gathered in particular from FIG. 2, the cartridge receptacle has a piercing means 16, in this case a spike 16, which, as can be seen in particular in FIG. 3, pierces the membrane, which is sealed to the flange region of the cartridge, such that the beverage substrate or foodstuff substrate can flow into the flow chamber 13 in particular along the outer face of the spike, which is provided preferably with outflow channels 17 on its outer side for this purpose.

Figure 2:
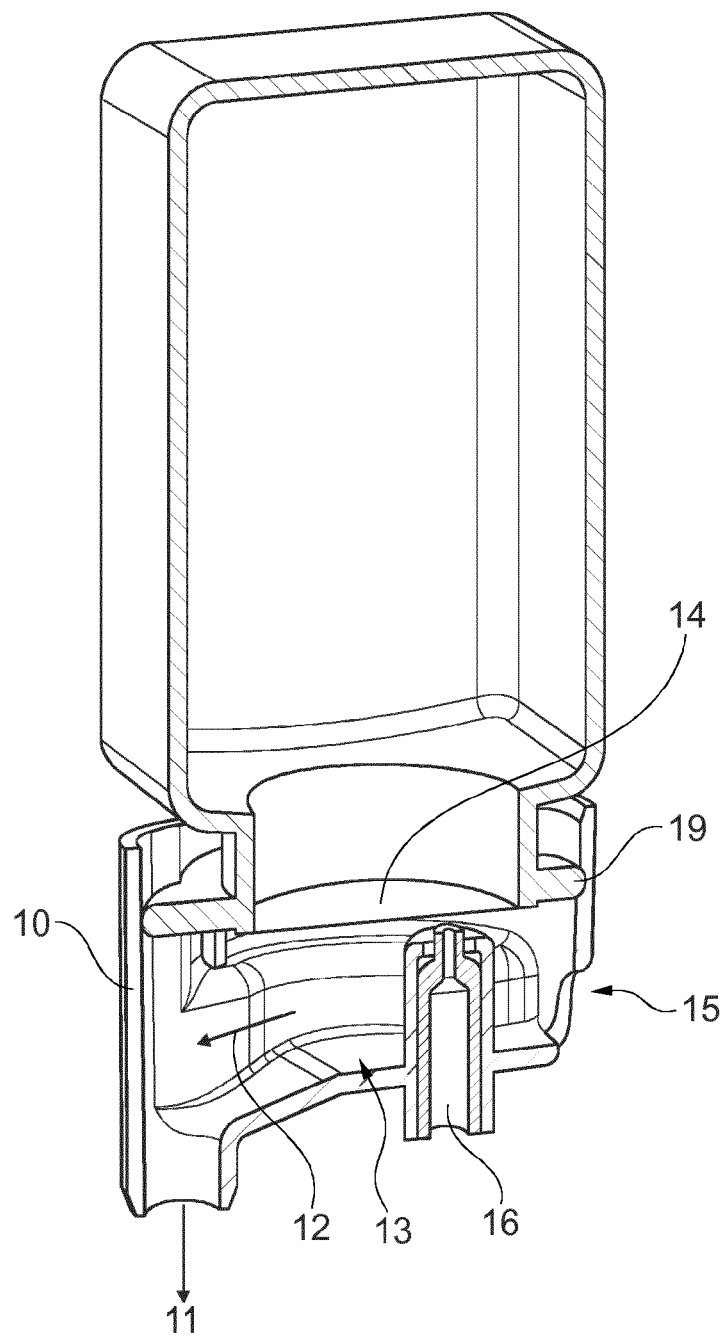
Figure 3:
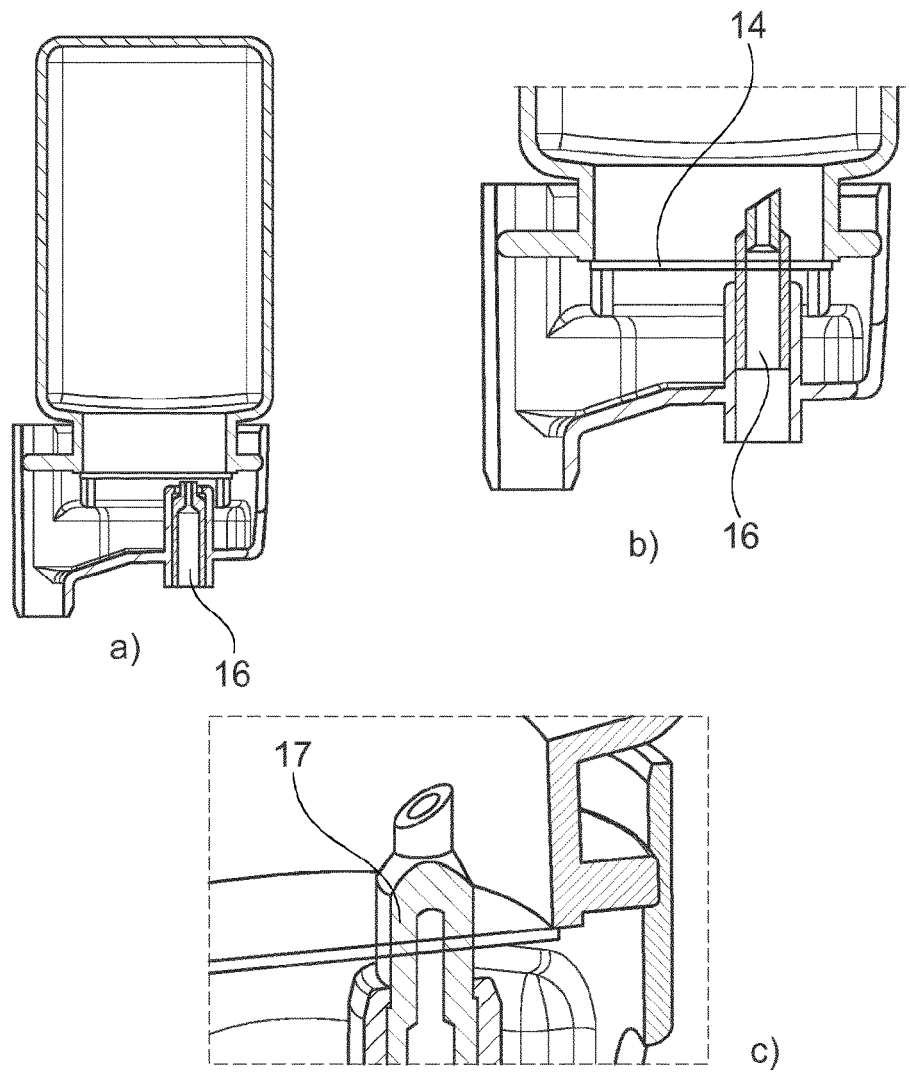

FIG. 2 shows the system before the piercing means 16 comes into engagement with the membrane 14. In order to achieve this, the cartridge and/or the cartridge receptacle are shifted longitudinally with respect to one another such that the spike 16 penetrates the membrane 14, this being clearly visible in particular from FIG. 3c). In said figure, the channels 17 through which the substrate flows into the mixing chamber can also be identified particularly well. The flow of the substrate into the mixing chamber can be accelerated and controlled in a targeted manner by gas which is pushed into the cartridge 1 through a duct 18 in the piercing spike 16. For example, the pressure in the cartridge can be adapted to the volumetric flow of the solvent.

Figure 4:
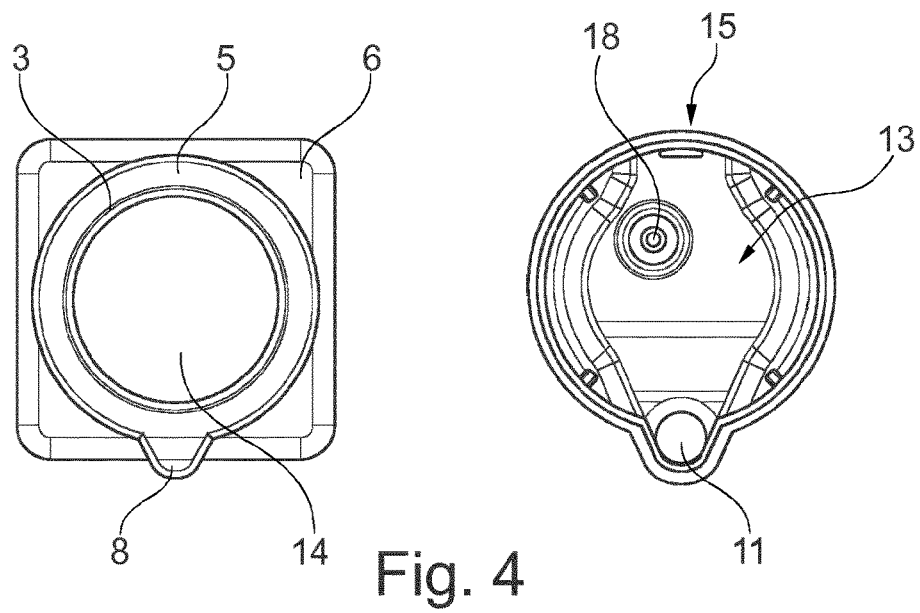

As can be gathered in particular from FIG. 1d) and FIG. 4, the flange 5 of the cartridge 1 cooperates in a sealing manner with the cartridge receptacle and as a result ensures that liquid leaves the mixing chamber only through the outflow 5. Furthermore, it is apparent in particular from these figures that the protuberance 8 in the present case is not only a positioning means but also covers the outflow 11 in the cartridge receptacle in particular in a sealing manner. The flange 8 and the protuberance 8 provided thereon can cooperate in a sealing manner, by way of their end face and/or by way of their circumference, with corresponding faces of the cartridge receptacle.

FIGS. 5-8 show a further embodiment of the system according to the invention. As regards the cartridge, reference can be made essentially to the statements made with regard to FIGS. 1 to 4, wherein the cartridge also has, in addition to the flange 5, a fastening means 20 in its connecting region, said fastening means 20 connecting the cartridge 1 to the cartridge receptacle 10. Furthermore, the wall region 6 has in the present case an indentation 24 which allows a longitudinal displacement between the cartridge and the cartridge receptacle and optionally a dispenser and which also represents a guide for the cartridge.

As regards the cartridge receptacle 10, too, reference can be made to the statements made with regard to FIGS. 1-4. However, as can be gathered in particular from FIG. 7, the cartridge receptacle in the present case has a fastening or securing ring 21 which is connected to the mixing chamber 13 by means of deformation and/or predetermined breaking points 22. This ring 21 cooperates in a force-fitting manner with the fastening means 20, for example in this case a collar 20 which is provided on the cartridge. Furthermore, it is clearly apparent from FIG. 7 that the cartridge receptacle 10, in addition to the spike 18, also has further piercing means 16. Through the spike 18, a gas is pushed into the cartridge, said gas pushing the substrate out of the cartridge. The opening means 16 cut into the membrane, in this case with angled cuts, which then form flaps which are pushed downward under the pressure of the substrate and thus allow the substrate to flow out more easily. A person skilled in the art will recognize that a piercing means 16 may also suffice, or that it is also possible to use the piercing of the membrane and the running out of the substrate as explained with reference to FIGS. 1-4 in the present case. Of course, the current opening means 16, 18 can also be transferred to the embodiment according to FIGS. 1 to 4.

Figure 5:
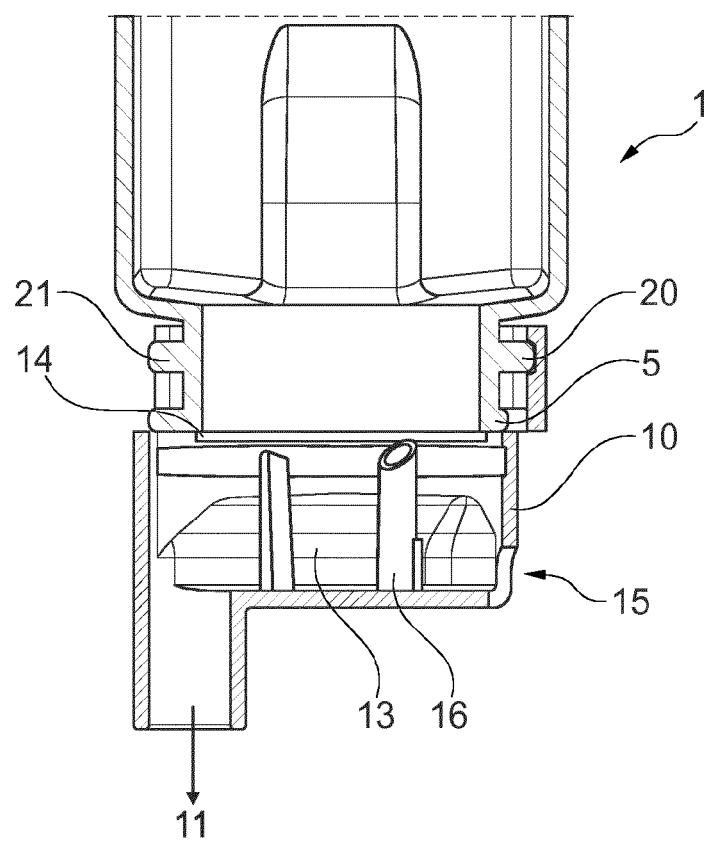
FIGS. 5-8 show a further embodiment of the system according to the invention.
Figure 6:
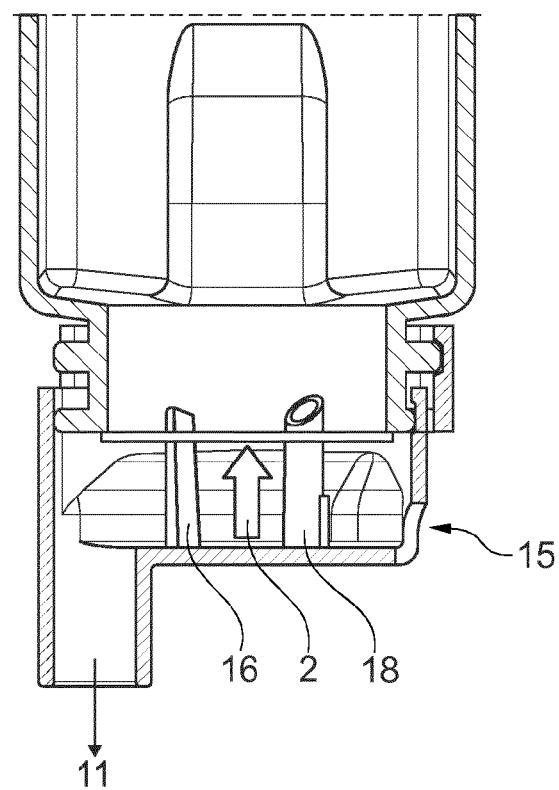
Figure 7:
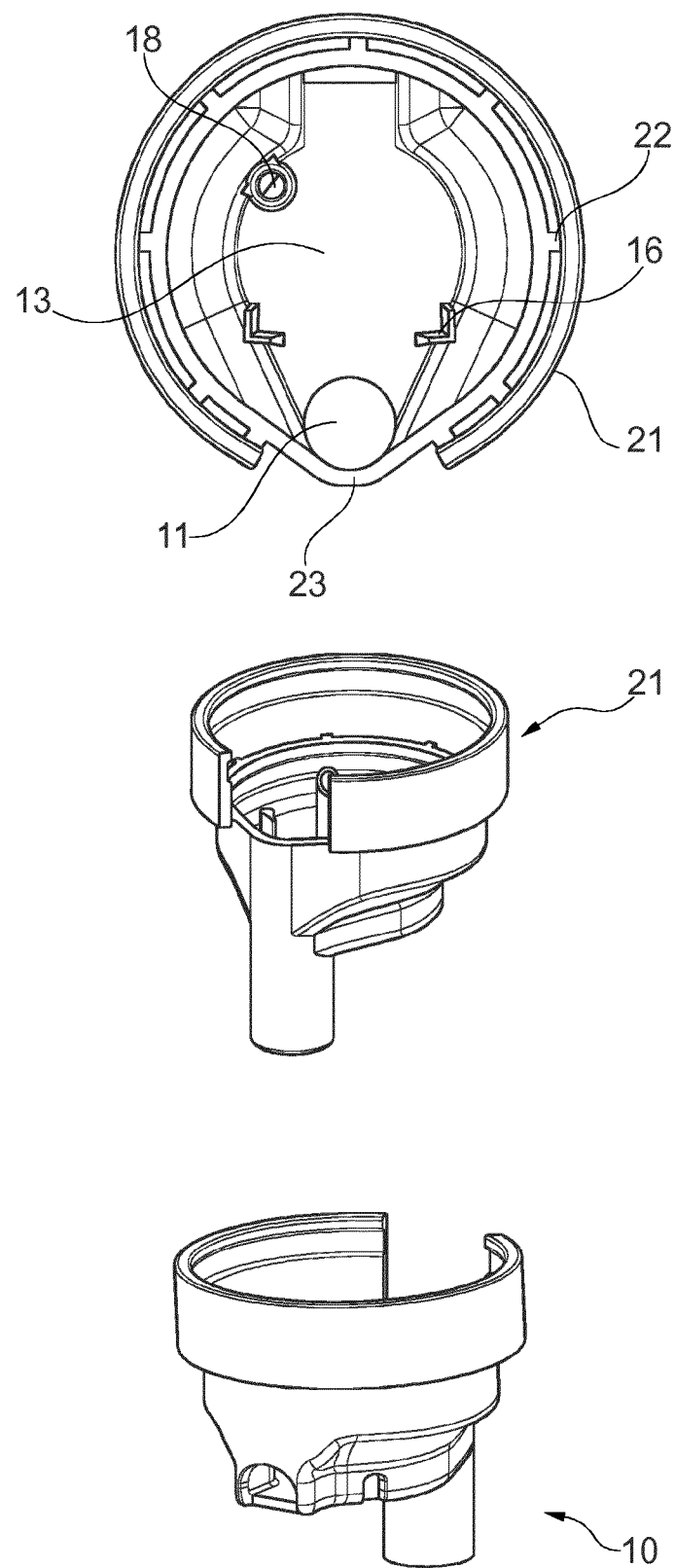
Figure 8:
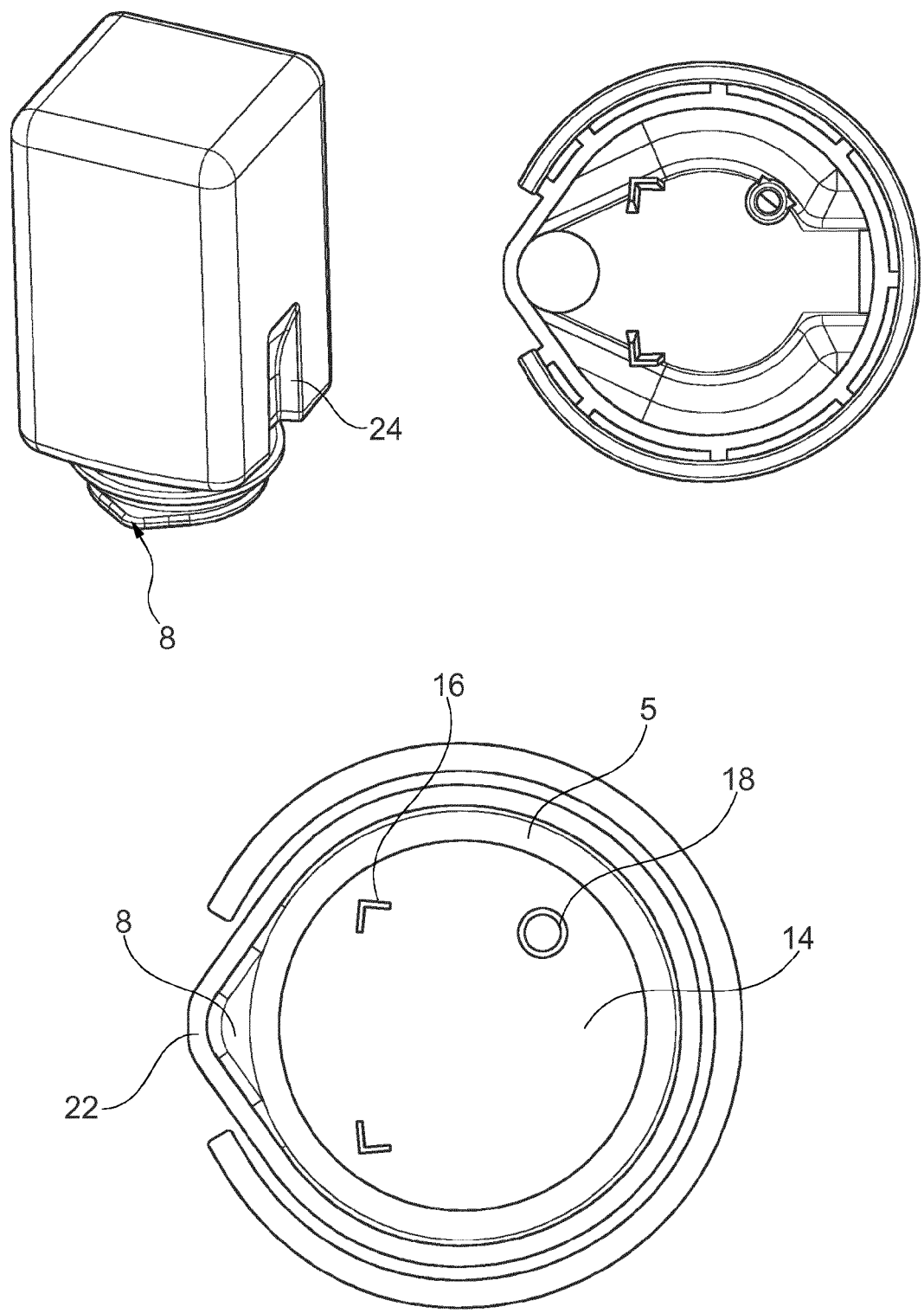

FIG. 5 shows the system prior to piercing. FIG. 6 shows the system after the membrane has been pierced. By way of a relative movement, illustrated by means of arrow 2, between the mixing chamber 13 and the cartridge 1, the predetermined deformation points and/or predetermined breaking points 22 are deformed or destroyed, respectively, such that the cartridge can move together with the ring 21 in the direction of the mixing chamber 13. As a result of this movement, in which the flange 5 is also introduced into the groove 27 and cooperates with the latter in a sealing manner, the membrane 14 is perforated and the substrate can flow out of the cartridge into the mixing chamber, in which it is mixed with a solvent, which is metered into the mixing chamber through the inflow 15, and leaves the mixing chamber through the outflow 11.

Figure 9:
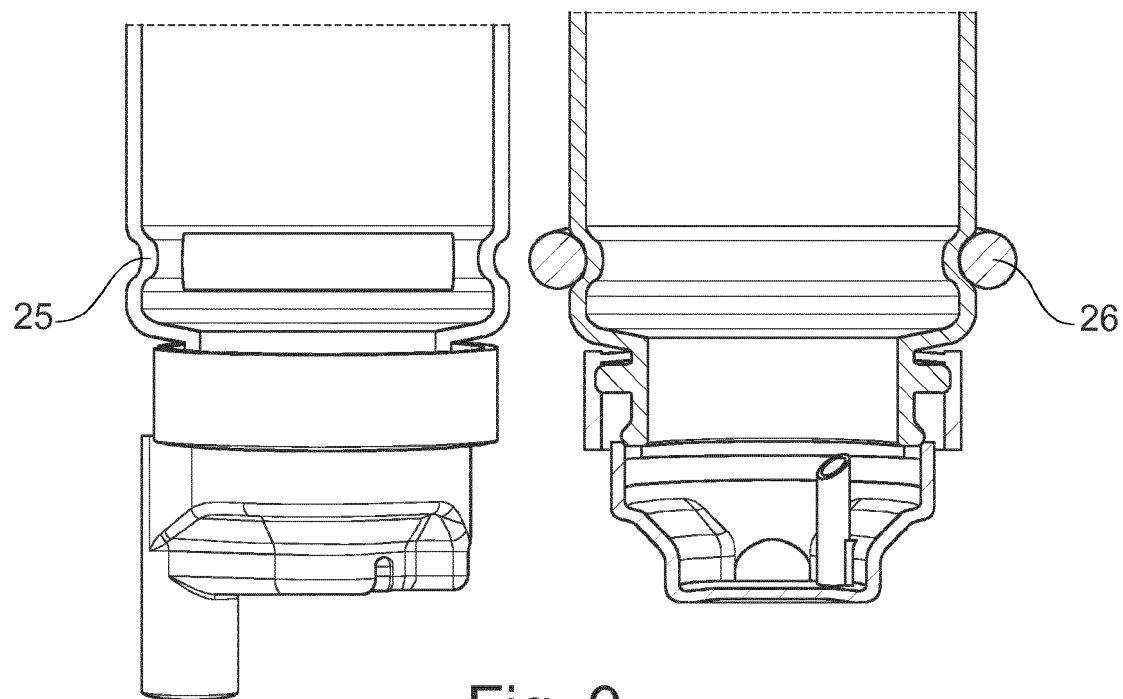
FIG. 9 shows an embodiment with a fastening means.

FIG. 9 shows a fastening means, in this case a groove 25, in the wall region of the cartridge. It is possible for a fastening means 26, with which the cartridge is fastened to a dispenser, to engage in this groove.

Figure 10:
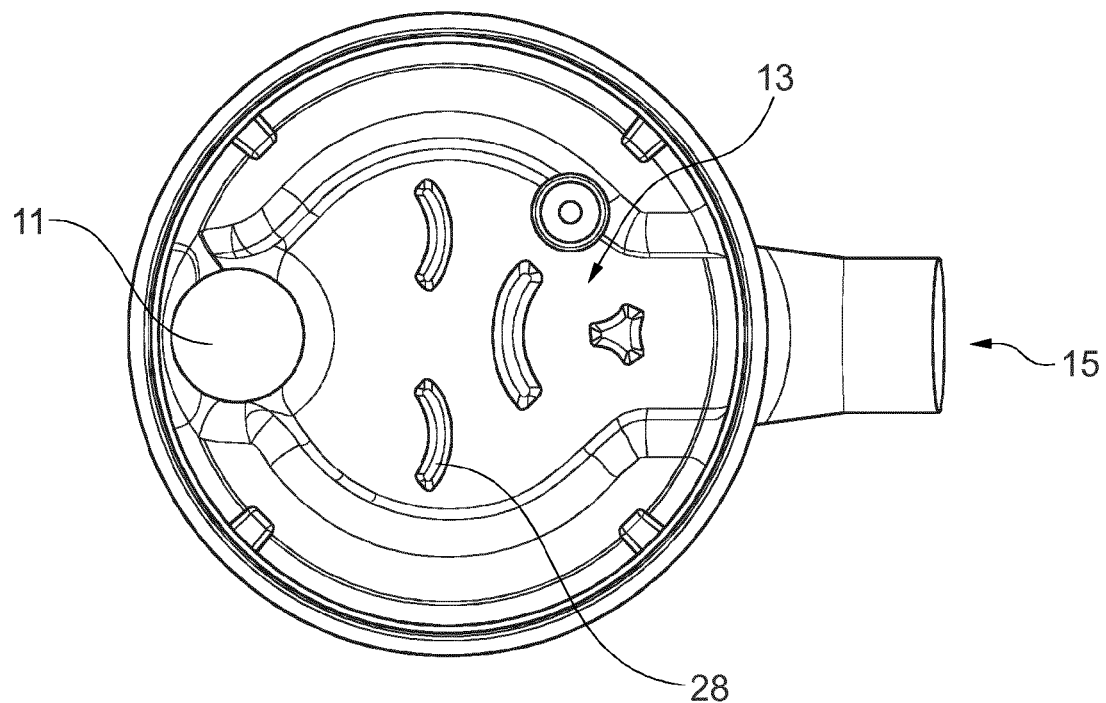
FIGS. 10 and 11 show two examples of mixing elements.
Figure 11:
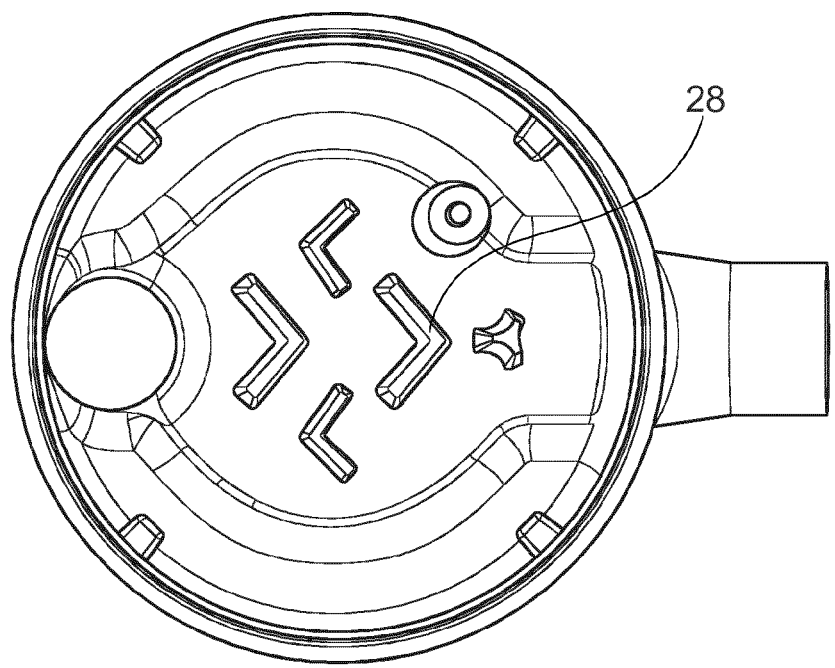

FIGS. 10 and 11 each show the mixing chamber in plan view. In the present case, the mixing chamber 13 is provided with a mixing element 28, which, in the present case, consists in each case of several components. In the embodiment according to FIG. 10, the components are in the form of circular ring segments, wherein the diameters of the circular rings can differ. In the embodiment according to FIG. 11, the components are angles. Preferably, the mixing elements 28 are designed such that they blend the substrate and the solvent together readily, but also such that only as small a pressure loss as possible arises.

Figure 12:
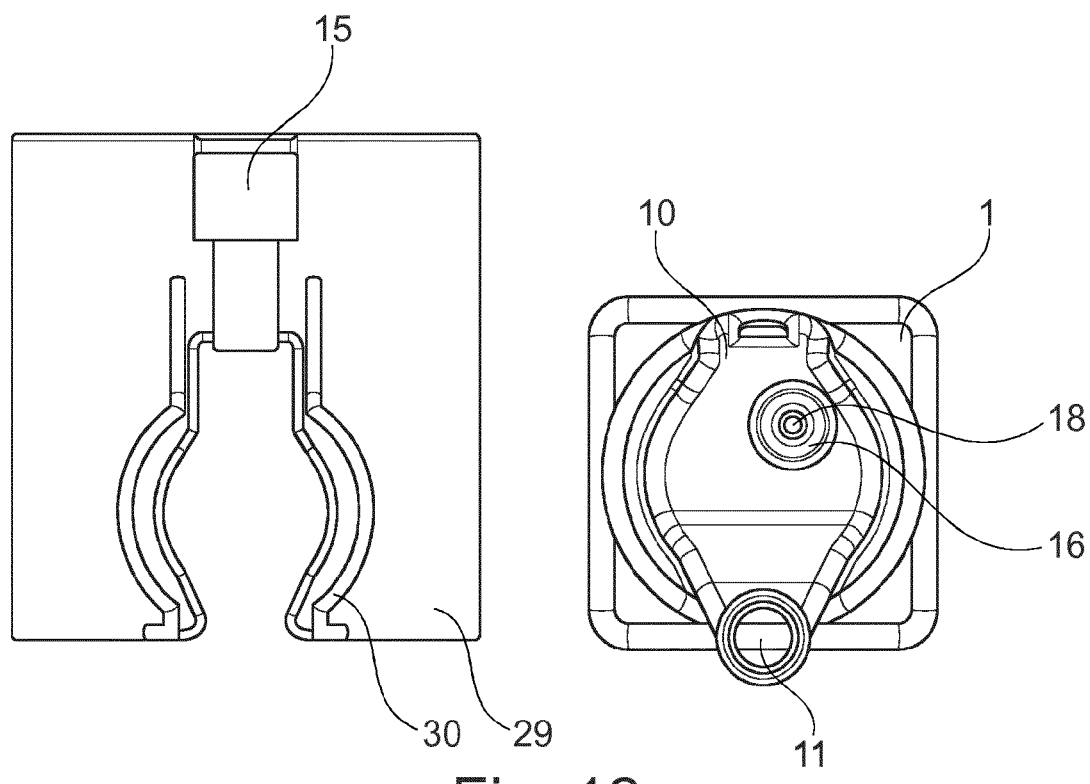
FIG. 12 shows the holder for the cartridge receptacle on the dispenser.

In FIG. 12, the system consisting of the cartridge 1 and the cartridge receptacle 10 is shown on the right-hand side. The view is from the direction of the outflow in this case. The left-hand illustration in FIG. 12 shows a holder 29 with which the system 1, 10 is held on a dispenser. The holder 29 has a cutout into which the bottom of the mixing chamber projects at least partially. The holder serves as a support for the system. Located beneath the holder 29 is a container, into which the finished beverage or foodstuff runs. Furthermore, the holder has a guide 30, which cooperates with the cartridge receptacle 10 in a form-fitting manner and secures the latter against slipping to the side and/or twisting relative to the holder 29. In the present case, the guide is provided in a manner spaced apart from the cutout. A person skilled in the art will understand that the function of securing against slipping and/or twisting can also be assumed by a form fit between the cutout and the bottom of the cartridge receptacle. The cutout is adjoined by a connection for the solvent, which is preferably not part of the holder, however.

Figure 13:
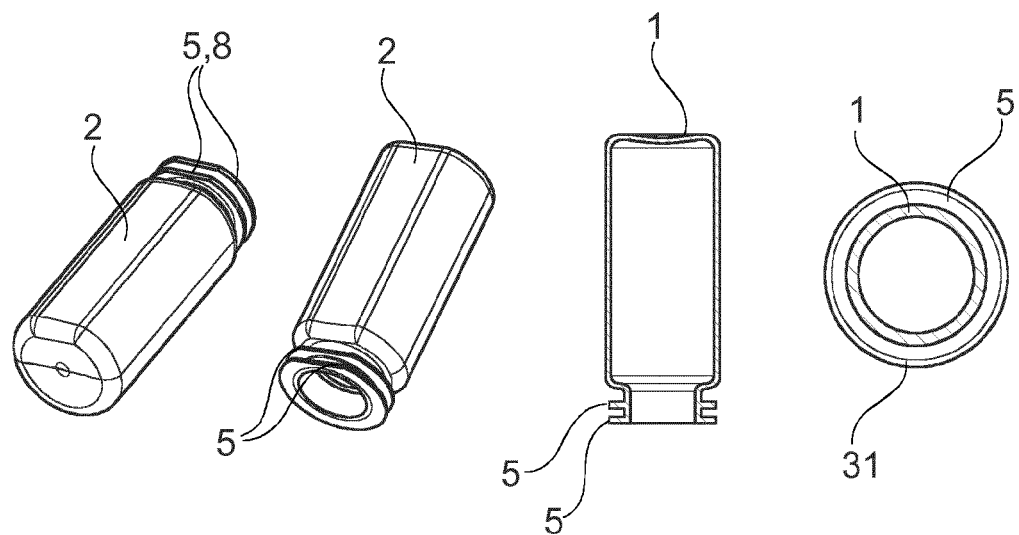
FIG. 13 shows a cartridge of a system according to a further embodiment of the present invention.

FIG. 13 illustrates four depictions of a cartridge 1 according to a further exemplary embodiment of the present invention. The cartridge 1 and the associated system of cartridge 2 and cartridge receptacle 10 (illustrated in FIG. 14) are similar in terms of their function to the system, explained with reference to FIGS. 1 to 4, according to the first embodiment of the present invention.

However, the cartridge 1 shown in FIG. 13 has, by contrast, two flanges 5. Both flanges 5 serve to fasten the cartridge receptacle 10 to the cartridge 1. In addition, the membrane 14 is sealed to the outer flange 5.

The cross section (perpendicular to the longitudinal axis of the cartridge 1) of the two flanges 5 has a substantially round circumference, wherein a rectilinear circumferential region 31 is provided on one side. In the rectilinear or flattened circumferential region 31, the circumference extends as a virtually straight line (visible on the underside of the flange 5 in the right-hand depiction in FIG. 13), while the circumference of the flange 5 away from the rectilinear circumferential region 31 extends as a curved line. The rectilinear circumferential region 31 serves as a positioning means, by way of which the orientation of the cartridge 1 is fixed with respect to the cartridge receptacle 10.

In FIG. 11, the matching cartridge receptacle 10 can be seen. It is apparent that, in the further embodiment, the circumference of the cartridge receptacle 10 has a shape corresponding to the contour of the two flanges 5 illustrated in FIG. 10, such that the cartridge 2 and cartridge receptacle 10 can be connected together only in a particular orientation with respect to one another. The rectilinear circumferential region 31 thus serves as a twist prevention means. Advantageously, this also defines the region of the cartridge 1 in which the gas is pushed into the cavity.

Arranged within the mixing chamber 13 is a spike guide 32 in which the spike 16 (also referred to as piercing means) is guided in a movable manner. Thus, in the further embodiment, the perforation of the membrane 14 is not brought about by a relative movement between the cartridge 1 and cartridge receptacle 10, but rather the spike 16 is guided in a movable manner in the cartridge receptacle 10 that is fixed relative to the cartridge 1. In this way, the spike 16 can be transferred from a retracted position (corresponds especially to the initial state of the system), in which the spike 16 is away from the membrane 14, into an extended position, in which the spike 16 protrudes into the cavity of the cartridge 1 and in the process perforates the membrane 14. In this extended position, the cartridge 1 is thus opened and the beverage substrate and/or foodstuff substrate can pass through outflow channels 17 in the outer face of the spike 16, past the membrane 14, and into the mixing chamber 13.

On a side of the cartridge receptacle 10 that faces the cartridge 1, a latching strip 33 is furthermore provided, which, in order to fasten the cartridge 1 to the cartridge receptacle 10, engages around one of the two flanges 5 in a form-fitting and/or force-fitting manner. In this way, a relative movement between the cartridge 1 and cartridge receptacle 10 is prevented.

Figure 14:
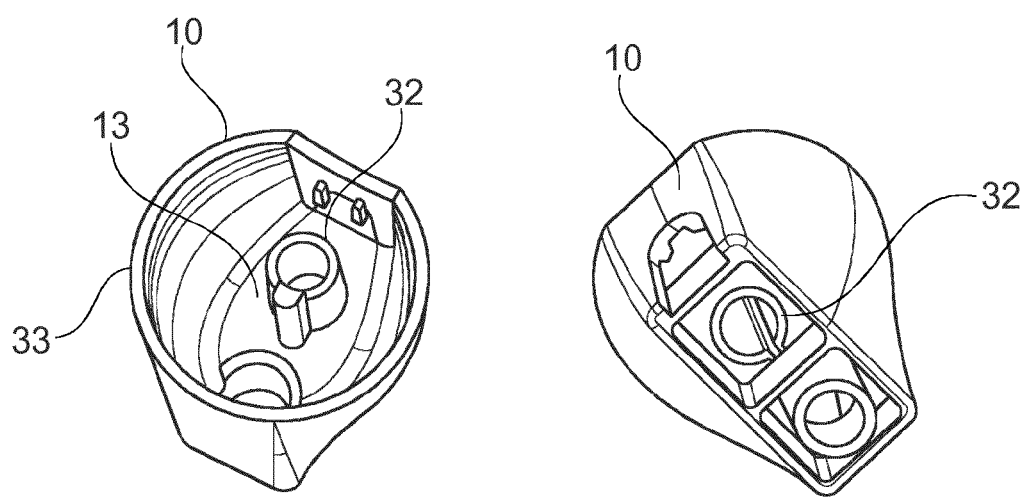
FIG. 14 shows a cartridge receptacle of the system according to the further embodiment of the present invention.
Figure 15:
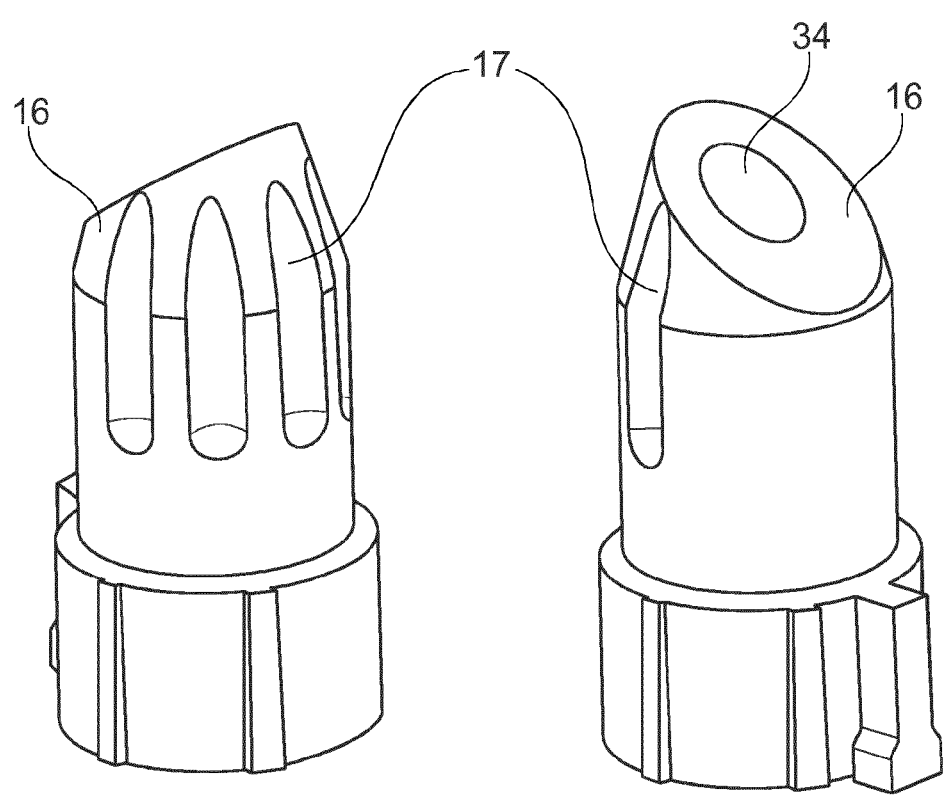
FIG. 15 shows a spike of the cartridge receptacle according to the further embodiment of the present invention.

FIG. 14 illustrates a schematic view of a spike 16 which is guided in the spike guide 32 shown in FIG. 13. The spike 16 has an internal compressed-air line 34, which serves as a gas inlet 18, and the outer outflow channels 17, through which the substrate can flow past the membrane 14 pierced by means of the spike 16 and into the mixing chamber 13. A compressed-air connection of the compressed-air line 34 for connecting to a compressed-air source is formed on a side of the spike 16 that is remote from the cartridge 1, said compressed-air connection being accessible from outside the cartridge receptacle 10, wherein a compressed-air outlet of the compressed-air line 34 for blowing the compressed air into the cartridge 1 is formed on a side of the spike 16 that faces the cartridge 1.

An arrangement in which the spike 16 shown in FIG. 14 is arranged in the spike guide 32 of the cartridge receptacle 10 shown in FIG. 13 and the cartridge receptacle 10 shown in FIG. 13 is then connected to the cartridge 1 shown in FIG. 12 represents a system according to the further exemplary embodiment of the present invention.

The present teachings envision any of the following features of a cartridge receptacle, system, and/or a beverage preparation machine in any combination: a cartridge receptacle having a diluent, in particular water, inflow, a mixing chamber in which the diluent and a beverage substrate and/or foodstuff substrate are mixed, and an outflow, wherein with regard to the direction of flow of the diluent, the flow cross section is first expanded and then reduced again; the mixing chamber has a protuberance; the outflow is provided in the protuberance; the cartridge receptacle has a fastening and/or securing ring; the fastening and/or securing ring is provided with a predetermined breaking point and/or predetermined deformation point at the mixing chamber; at least one mixing element is provided in the mixing chamber; the cartridge receptacle has a piercing means which perforates the membrane; the cartridge receptacle has a spike guide; the piercing means is mounted in a displaceable manner within the spike guide; the piercing means is displaceable between a retracted position, in which the piercing means is away from the membrane, and an extended position, in which the piercing means pierces the membrane of the cartridge and projects into the cartridge; at least one lateral channel for conveying the beverage substrate and/or foodstuff substrate in the direction of the mixing chamber when the membrane is pierced by the piercing means has been introduced into the outer wall of the piercing means; a compressed-air line is integrated into the piercing means; a compressed-air connection of the compressed-air line for connecting to a compressed-air source is formed on a side of the piercing means that is remote from the cartridge, the compressed-air connection being accessible in particular from outside the cartridge receptacle; a compressed-air outlet of the compressed-air line for blowing the compressed air into the cartridge is formed on a side of the piercing means that faces the cartridge; the inflow and the outflow are provided at opposite ends of the cartridge receptacle; the piercing means is provided in a manner aligned with the inflow and the outflow; a system having a cartridge receptacle in which a cartridge is provided, wherein the cartridge has a wall region, one end of which is adjoined by a connecting region which is closed, in particular by a membrane, and at the opposite end of which optionally a bottom region is provided, wherein the wall region and optionally the bottom region define a cavity which accommodates a beverage substrate and/or foodstuff substrate; the connecting region has a flange which is provided with a positioning means and/or covering means; the positioning means and/or covering means is an indentation and/or protuberance which protrudes from the flange, in particular the circumference thereof; a neck is provided between the wall region and the connecting region; the membrane is provided on the flange; the cartridge receptacle is provided in the connecting region of the cartridge; the flange cooperates in a sealing manner with the cartridge receptacle; the cartridge and the cartridge receptacle are connected together in a rotationally fixed manner; and the covering means covers the outflow of the cartridge receptacle.

LIST OF REFERENCE SIGNS

1 Cartridge
2 Direction of movement
3 Neck
4 Connecting region
5 Flange
6 Wall region
7 Bottom region
8 Positioning and/or covering means, indentation and/or protuberance
9 Inflow of the substance, piercing means
10 Cartridge receptacle
11 Outflow of substance plus solvent/water
12 Direction of flow of substance plus solvent/water
13 Mixing chamber
14 Closure, membrane
15 Solvent inflow, water inflow
16 Piercing means, spike
17 Outflow channels
18 Gas inlet
19 Seal, collar seal
20 Fastening means, collar
21 Fastening ring, securing ring
22 Deformation and/or predetermined breaking point
23 Indentation and/or protuberance of the cartridge receptacle
24 Indentation, guide
25 Form-fitting means for a fastening means 26
26 Fastening means
27 Sealing means, groove
28 Mixing elements
29 Holder
30 Guide for the cartridge receptacle
31 Rectilinear circumferential region
32 Spike guide
33 Latching strip
34 Compressed-air line

The invention claimed is:

1. A cartridge receptacle having:
   a) a diluent inflow;
   b) a mixing chamber in which a diluent and a beverage substrate, a foodstuff substrate, or both the beverage substrate and the foodstuff substrate are mixed;
   c) an outflow;
   d) a piercing means which is configured to perforate a membrane of a cartridge;
      wherein with regard to a direction of flow of the diluent, a flow cross section is first expanded and then reduced again;
      wherein the piercing means is located within the direction of flow and between the diluent inflow and the outflow; and
      wherein at least one mixing element is provided in the mixing chamber.

2. The cartridge receptacle according to claim 1, wherein the diluent is water.

3. The cartridge receptacle according to claim 1, wherein the mixing chamber has a protuberance.

4. The cartridge receptacle according to claim 3, wherein the outflow is provided in the protuberance.

5. The cartridge receptacle according to claim 1, wherein the cartridge receptacle has a fastening ring, a securing ring, or both the fastening ring and the securing ring.

6. The cartridge receptacle according to claim 5, wherein the fastening ring, the securing ring, or both the fastening ring and the securing ring are provided with a predetermined breaking point, a predetermined deformation point, or both the predetermined breaking point and the predetermined deformation point at the mixing chamber.

7. The cartridge receptacle according to claim 1, wherein the cartridge receptacle has a spike guide and the piercing means is mounted in a displaceable manner within the spike guide; and
   wherein the piercing means is displaceable between a retracted position, in which the piercing means is away from the membrane, and an extended position, in which the piercing means pierces the membrane of the cartridge and projects into the cartridge.

8. The cartridge receptacle according to claim 7, wherein at least one lateral channel for conveying the beverage substrate, the foodstuff substrate, or both the beverage substrate and the foodstuff substrate in a direction of the mixing chamber when the membrane is pierced by the piercing means has been introduced into an outer wall of the piercing means.

9. The cartridge receptacle according to claim 8, wherein a compressed-air line is integrated into the piercing means, and wherein a compressed-air connection of the compressed-air line for connecting to a compressed-air source is formed on a side of the piercing means that is remote from the cartridge, said compressed-air connection being accessible in particular from outside the cartridge receptacle, and wherein a compressed-air outlet of the compressed-air line configured to blow compressed air into the cartridge is formed on a side of the piercing means that faces the cartridge.

10. A system having the cartridge receptacle according to claim 1, wherein the cartridge is provided,
   wherein the cartridge has a wall region, one end of which is adjoined by a connecting region which is closed by the membrane, and at an opposite end of which optionally a bottom region is provided; and
   wherein the wall region, and optionally the bottom region, define a cavity which accommodates the beverage substrate, the foodstuff substrate, or both the beverage substrate and the foodstuff substrate.

11. The system according to claim 10, wherein the connecting region has a flange which is provided with a positioning means, a covering means, or both the positioning means and the covering means.

12. The system according to claim 11, wherein the positioning means, the covering means, or both the positioning means and the covering means is an indentation, a protuberance, or both the indentation and the protuberance which protrudes from the flange.

13. The system according to claim 12, wherein the indentation, the protuberance, or both the indentation and the protuberance protrudes from a circumference of the flange.

14. The system according to claim 11, wherein the membrane is provided on the flange.

15. The system according to claim 11, wherein the flange cooperates in a sealing manner with the cartridge receptacle.

16. The system according to claim 10, wherein a neck is provided between the wall region and the connecting region.

17. The system according to claim 10, wherein the cartridge receptacle is provided in the connecting region of the cartridge.

18. The system according to claim 10, wherein the cartridge and the cartridge receptacle are connected together in a rotationally fixed manner.

19. The system according to claim 10, wherein a covering means covers the outflow of the cartridge receptacle.

\* \* \* \* \*